United States Patent [19]
Reilly et al.

[11] Patent Number: 5,572,620
[45] Date of Patent: Nov. 5, 1996

[54] FAULT-TOLERANT VOTER SYSTEM FOR OUTPUT DATA FROM A PLURALITY OF NON-SYNCHRONIZED REDUNDANT PROCESSORS

[75] Inventors: Timothy J. Reilly, Plymouth; Michael L. Sheffels, Brooklyn Park, both of Minn.

[73] Assignee: Honeywell Inc., Minneapolis, Minn.

[21] Appl. No.: 481,231

[22] Filed: Jun. 8, 1995

Related U.S. Application Data

[63] Continuation of Ser. No. 98,685, Jul. 29, 1993, abandoned.
[51] Int. Cl.⁶ .................................................. G06F 11/16
[52] U.S. Cl. ................................................. 395/182.09
[58] Field of Search ........................... 395/182.09, 200, 395/275, 325, 375, 550, 650, 725; 371/36; 364/269.1, 550, 270.1, 270.2, 268.3, 268.9, 285.3, 943.9, 448.3

[56] References Cited

U.S. PATENT DOCUMENTS

| | | | |
|---|---|---|---|
| 5,193,175 | 3/1993 | Cutts, Jr. et al. | 395/182.09 |
| 5,239,641 | 8/1993 | Horst | 395/550 |
| 5,276,823 | 1/1994 | Cutts, Jr. et al. | 395/182.09 |
| 5,295,258 | 3/1994 | Jewett et al. | 395/182.1 |
| 5,317,726 | 5/1994 | Horst | 395/182.1 |
| 5,339,404 | 8/1994 | Vandling, III | 395/180 |

Primary Examiner—Robert W. Beausoliel, Jr.
Assistant Examiner—Stephen C. Elmore
Attorney, Agent, or Firm—Charles J. Ungemach

[57] ABSTRACT

Disclosed is a data message voter system for data messages from a plurality of loosely synchronized redundant processors. The data message voter system comprises a data receiver associated with each processor for capturing the data message from the processor. In turn, the voter only votes on those data messages captured by the receivers within an approximate skew time.

6 Claims, 10 Drawing Sheets

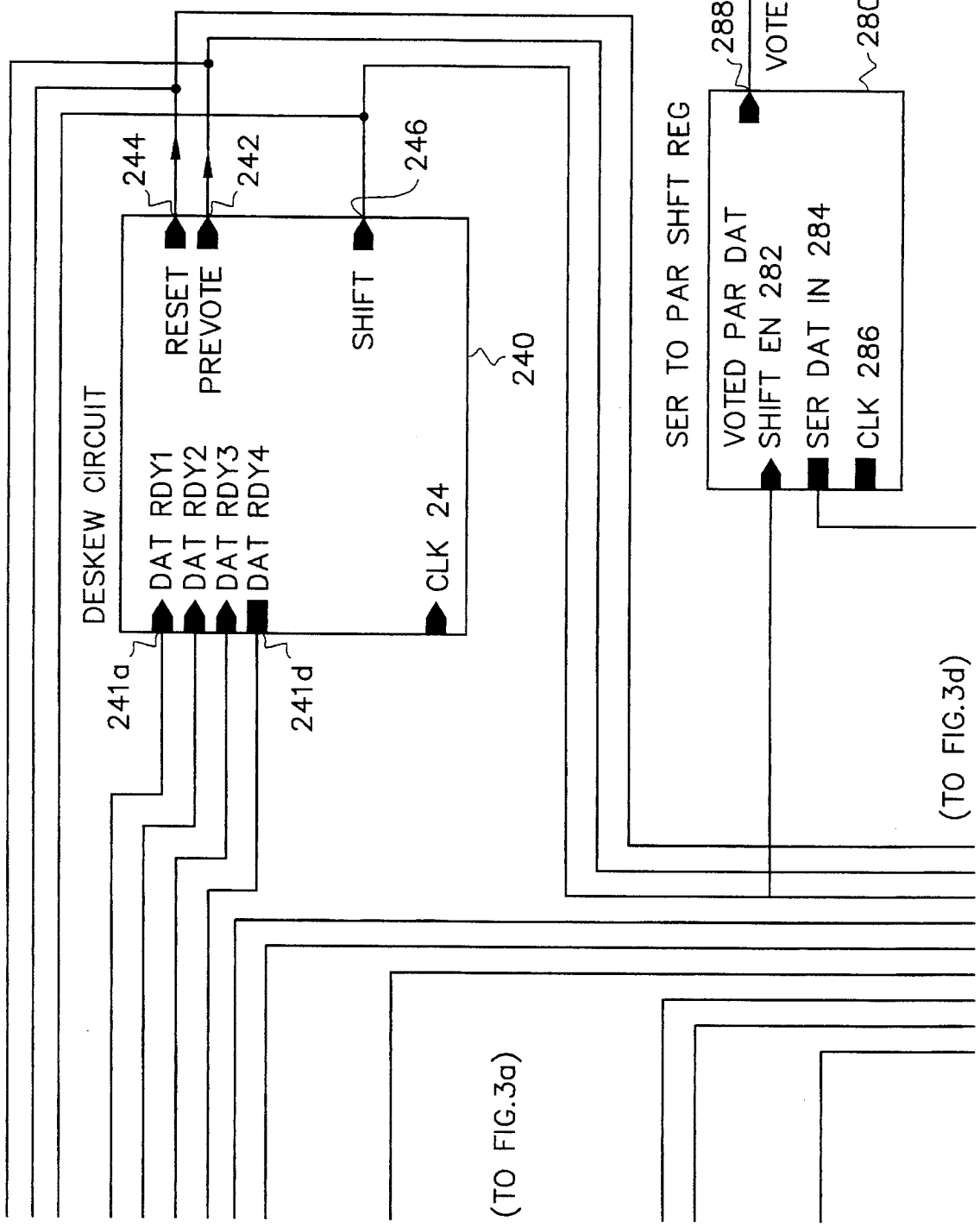

FAULT-TOLERANT VOTER SYSTEM FOR OUTPUT DATA FROM A PLURALITY OF NON-SYNCHRONIZED REDUNDANT PROCESSORS

This application is a continuation of application Ser. No. 08/098,685, filed Jul. 29, 1993, now abandoned.

BACKGROUND OF THE INVENTION

1. Field of Invention

The present invention relates to fault-tolerant systems employing multiple processor systems where the output data words of the processors are processed by a majority voter.

2. Description of the Related Art

Fault-tolerant operation of data processing systems is of paramount importance when such systems are employed for aircraft navigation and flight control. Commonly, aircraft applications require redundant systems whose outputs are cross-checked before being utilized by a flight management system which may include, among others, navigation subsystems and/or flight control subsystems. In those situations where a plurality of processors operate on the same input data, the intended output data of each of the processors should be identical, thereby verifying the integrity of the output data. If, of course, the output data of the independent processing systems are different, a scheme must be employed to determine as to which of the plurality of processors is in error so that the faulty processor may be disabled so that the flight management system may continue to functionally operate with the remaining processors by tolerating the fault but not use the faulty processor's output data.

Commonly, flight management systems generally employ a microprocessor for processing sensor input data by executing a fixed set of instructions requiring a fixed number of clock cycles of the system clock generator to execute these instructions. The total number of clock cycles to execute the fixed set of instructions is sometimes referred to as a "frame". In order to provide independent redundancy, generally associated with each microprocessor is an independent processor clock generator, commonly employing a high frequency oscillator.

In fault-tolerant multiple processor systems where the output data of each of the processor-oscillator pairs is presented to a synchronous majority voter, the majority voter is such that when a processor-oscillator pair provides data that is different than the other processors, the majority voter simply votes out or inhibits the use of the data output from the faulty processor-oscillator pair.

Employment of a synchronous majority voter with fault-tolerant multiple processor systems requires synchronous like serial data which is compared bit-for-bit by the majority voter. Generally, attainment of synchronous processor output serial data of the plurality of processors while maintaining processor independence is a difficult problem since the processors will start executing the same instructions at the same time, but may drift with respect to each other due to oscillator drift. In these circumstances, bit-for-bit voting of output serial data from the processors will vote out the processor-oscillator pair output serial data due to differing processor clock rates even though the output serial data is valid. This, of course places stringent requirements on the separate processor clock generators for each of the redundant processors so that each processor is outputting serial data at substantially the same time This is so, since if they are not, the majority voter may, perhaps, vote out all of the processors. However, even if the oscillators are closely matched, the oscillators may still drift relative to each other.

One solution for relaxing the stringent requirements of the oscillators and not reject good data is to operate the processors in lock step. However, few processors have this capability, and processors that do, are expensive. Further, processors which run in lock step require a common oscillator, rather than separate processor-oscillator pairs which makes the fault-tolerant system dependent upon the single common oscillator. Accordingly, a very high reliability common oscillator would be required since it is a single-point failure of all of the processors.

SUMMARY OF THE INVENTION

An object of the present invention is to provide a fault-tolerant voter system for output data from a plurality of non-synchronized redundant processor-oscillator pairs which tolerates data time skew between output data from the processors.

The voter system in accordance with the present invention employs a plurality of serial data receivers, one receiver for each selected one of a plurality of processors. Each of the plurality of receivers is operative for (i) receiving the output serial data word from the selected processor, (ii) providing a data ready signal after the receiver has received the output serial data word from the processor, and (iii) serially outputting, at an output means thereof, a delayed serial data word in response to a command signal, where the delayed serial data word is intended to be identical to the output serial data word from the processor, and where the delayed serial data word is serially outputted subsequent to the data ready signal, synchronously with a clock signal, and in fixed time relation to the command signal. The voting system in accordance with the present invention further includes a data skew checking means responsive to the data ready signals of each of the plurality of receivers, and provides the command signal for the receiver which occurs a selected skew time after the second occurrence of two successive data ready signals, associated with any two of the plurality of receivers, and in which these two successive data ready signals occur within a selected delay time. The voter system further includes a majority voter means having a plurality of input means, where each input means is connected to the output means of a selected one of the plurality of receivers, and provides bit-for-bit comparing of the delayed serial data words provided by the receivers. The majority voter means, in turn, provides an output data word which is a voted data word resulting from bit-for-bit majority voting.

DESCRIPTION OF THE PREFERRED EMBODIMENT

Figure 1:
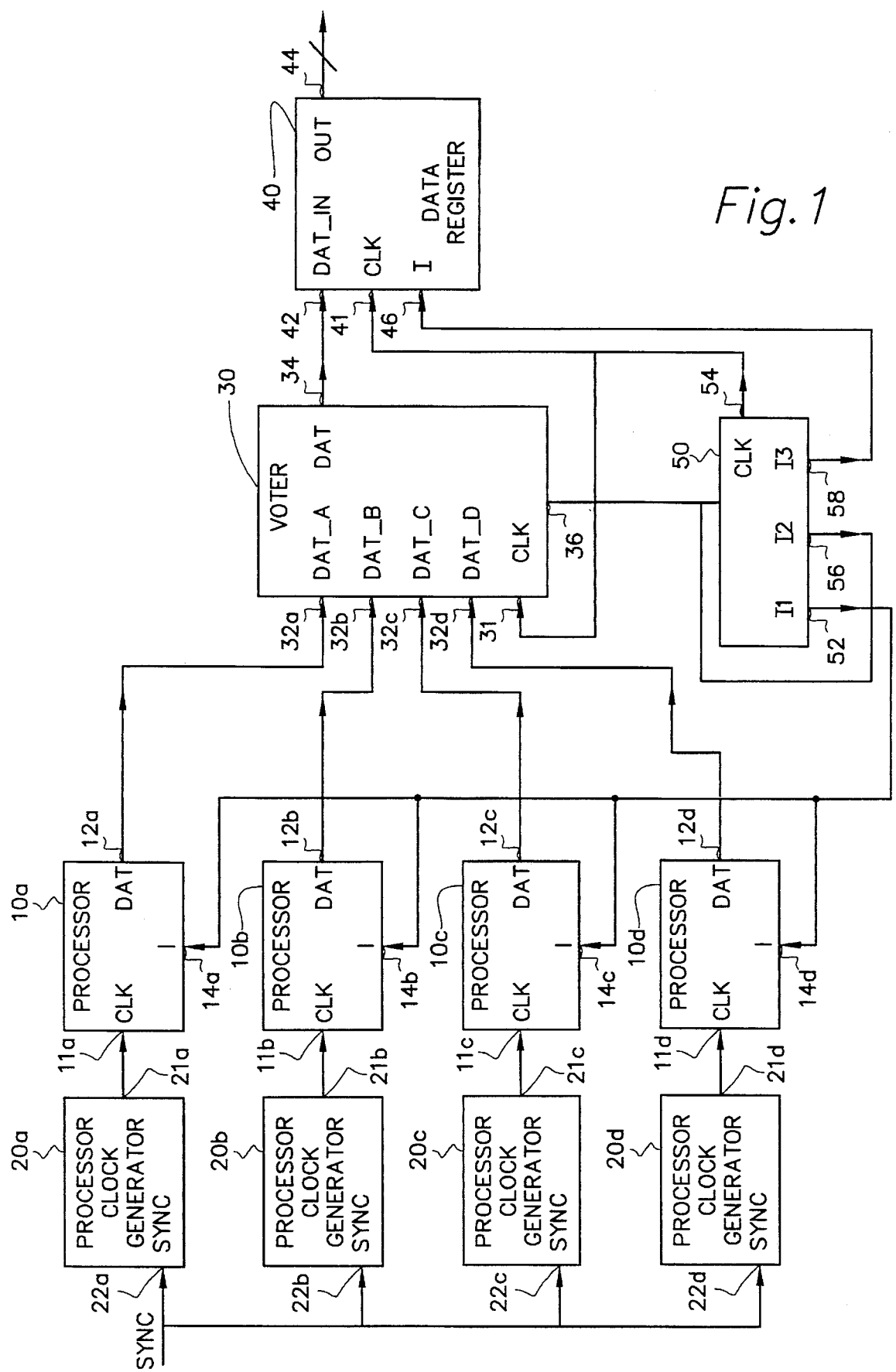
FIG. 1 is a voter system of the prior art.

Illustrated in FIG. 1 is a prior art fault-tolerant multiple redundant processor system and voter system for processing the data output from a plurality of non-synchronized redundant processors. In the following exposition, the letter designation of identical functioning blocks, and signal input/output means are matched so as to facilitate understanding of the invention. For example, processor 10a is clocked by processor clock generator 20a providing an output at output means 12a connected to input means 32a of majority voter means 30. Further, absence of the letter suffix refers generically to same functioning blocks or elements or connections.

Referring to FIG. 1, thereshown are four independent data processors 10a–d, each operating on common input data (not shown). Associated with each processor 10 is an independent processor clock generator 20a–d, respectively. Each processor 10 executes a set of instructions at the clock rate of the corresponding processor clock generator 20. The clock output means 21a–d of each processor clock generator 20 is connected to the corresponding clock input means 11a–d of the corresponding processor 10a–d. For example the output 21a of clock generator 20a is connected to the clock input 11a of processor 10a.

Each of the processors 10a–d includes a serial data output means 12a–d, respectively. These latter mentioned output means are electrically connected to serial data input means 32a–d, respectively, of majority voter means 30. Majority voter means 30 includes a voted serial data output means 34. The voted serial data output means 34 is connected to serial data input means 42 of voted output data register means 40. Voted output data register means 40 includes output means 44 for providing the intended digital output word, either in parallel form or alternatively in serial form.

Further shown in FIG. 1 is a controller 50 which includes an independent voter system clock generator (not shown) for providing a voter system clock signal (CLK) at clock output means 54. Output means 54 is connected to clock input means 31 and 41 of majority voter means 30 and voted data register means 40, respectively, so that these components operate synchronously with the voter system clock signal. Controller 50 also provides a plurality of separate system interrupt signals I1, I2, and I3 at output means 52, 56, and 58, respectively. As illustrated, output means 52 is connected to the start interrupt input means 14a–d of processors 10a–d, respectively. Output means 56 and output means 58 are connected to vote interrupt input means 36 and send interrupt input means 46 of majority voter means 30 and voted output data register means 40, respectively.

It should be noted that majority voter means 30, voted data register means 40, and controller 50, although illustrated as separate function blocks, may generally be implemented by a digital circuit, and more specifically, an "ASIC" (Application Specific Integrated Circuit).

In FIG. 1, processors 10a–d, represent computational devices for operating on digital data at the input thereof, and represent computer devices which may include a microprocessor and the like for processing digital input data, and in turn, provide digital output data words which represent information derived from the input data. For example, in the navigational arts, the data words may represent the instantaneous acceleration, rotation, or the like, derived from gyro and acceleration data as inputs to the processor.

The operation of FIG. 1 will now be described. As illustrated in FIG. 1, the fault-tolerant multiple processor system includes processor-oscillator pairs. Namely, processor 10a and oscillator 20a, processor 10b and oscillator 20b, and processor 20c and oscillator 20c, and processor 10d and oscillator 20d. The oscillators are intended to be identical in clock frequency and phase. In turn, the processors will execute a set of instructions after simultaneously receiving a start interrupt signal I1 at input means 14 from controller 50 to provide output data derived from identical input data.

For purposes of understanding the invention, it should be understood that each of the processors 10a–d provides serial output data words. If processor clock generators 20a–d provide a clock input signal to their corresponding processor having exactly identical frequency and phase, then the serial data output from the processors will also be identical for processors receiving identical input data.

Majority voter means 30, receiving identical input data at the same time at input means 32a–d from processors 10a–d, will provide a majority vote of the serial input data. This serial input data being identical, the majority voter means will in turn output a voted serial data word at the output means 34 thereof which is identical to the serial output data words provided by each of the processors 10a–d.

In turn, voted data register means 40 appropriately enabled by a send interrupt signal at send interrupt input means 46 at the correct time by controller 50, will receive the serial data output word from majority voter means 30, and subsequently provide the voted data output word at the parallel output means 44. As will be understood by those skilled in the art, output means 44 is in fact a plurality of data lines which represent the parallel or serial output of voted data register means 40.

The fault-tolerant multiple processor system and voter system illustrated in FIG. 1 is intended to provide reliable output data at output means 44, specially in those situations where some fault condition is present such that not all processors are providing identical data, or the identical data is not present at substantially identical times. For example, conditions which may cause system faults include, among others, faulty input data signal lines into the processor, a faulty processor, or a faulty clock-input from the corresponding processor clock generator. In those situations when the serial output data from the processors are not identical, majority voter means 30 is intended to "vote out" the faulty data.

As noted in FIG. 1, each of the oscillators includes a sync input means 22 for receiving a sync signal so that the processor clock signal generators may be loosely synchronized. Although the oscillators are intended to be precise, there still remains some allowable skew time between the fastest and slowest oscillator output signals, particularly at the limits of the intended operating temperature. In turn, the processors will thereby operate faster or slower relative to one another such that the serial output data from each of the processors presented as inputs to the majority voter means 30 may not be synchronized. In other words, the processors will start executing the same instructions at about the same time, but will not provide synchronized output data with respect to each other due to oscillator frequency skew. In turn, the bit-for-bit voting by the majority voter means 30 is no longer reliable since it has no knowledge of which of the processors is within the allowed frequency skew.

Figure 2:
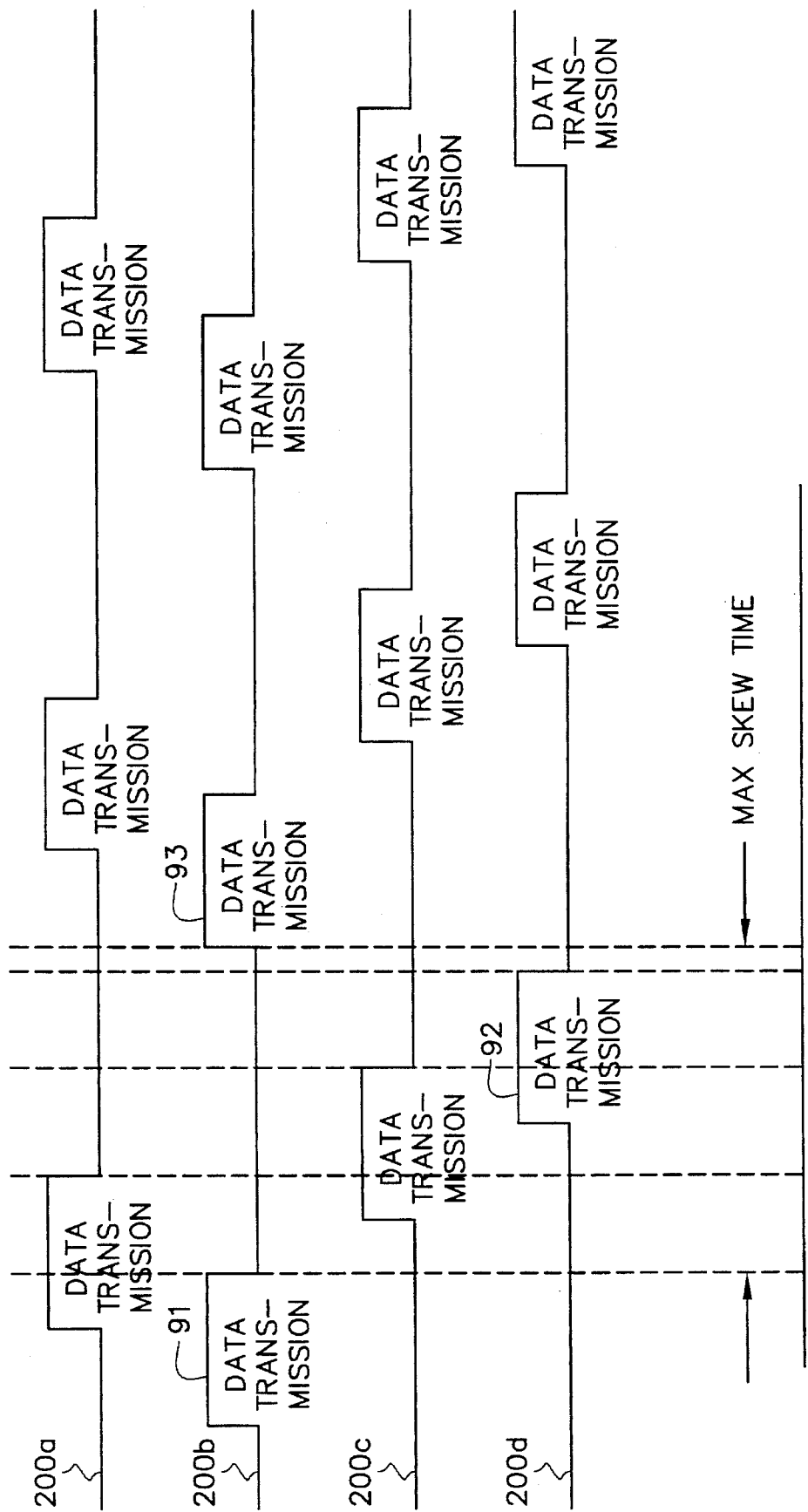
FIG. 2 is a non prior art timing diagram of a plurality of illustrating a timing relationship scenario of output data messages from a plurality of loosely synchronized processors.

FIG. 2 is a timing diagram 200a–d which illustrates the data transmission at output means 12a–d of processors 10a–d, respectively, in which processor 10b is the earliest to transmit an output serial data word 91 and processor 10d is the latest to transmit an output serial data word 92. An object of the present invention is to provide a voting system so as to not reject data from any of the processors as long as the processors provide their respective output serial data word before the second output data word 93 is transmitted from the earliest processor (processor 10b)—outside the worst case skew period, T1.

Since it is statistically improbable that clock generators 20a–d have identical frequency and phase, the lock step scheme is frequently chosen which provides tight synchronization. It should be noted that the timing diagram like that illustrated in FIG. 2 would result in a "fault" situation since none of the processors provide synchronized data, even though the oscillators may be loosely synchronized by the SYNC signal 2 of FIG. 1. In the present invention as illustrated in FIG. 3, all of the data may be accepted providing that certain timing relationships between the data are held true as will be described.

Figure 3A:
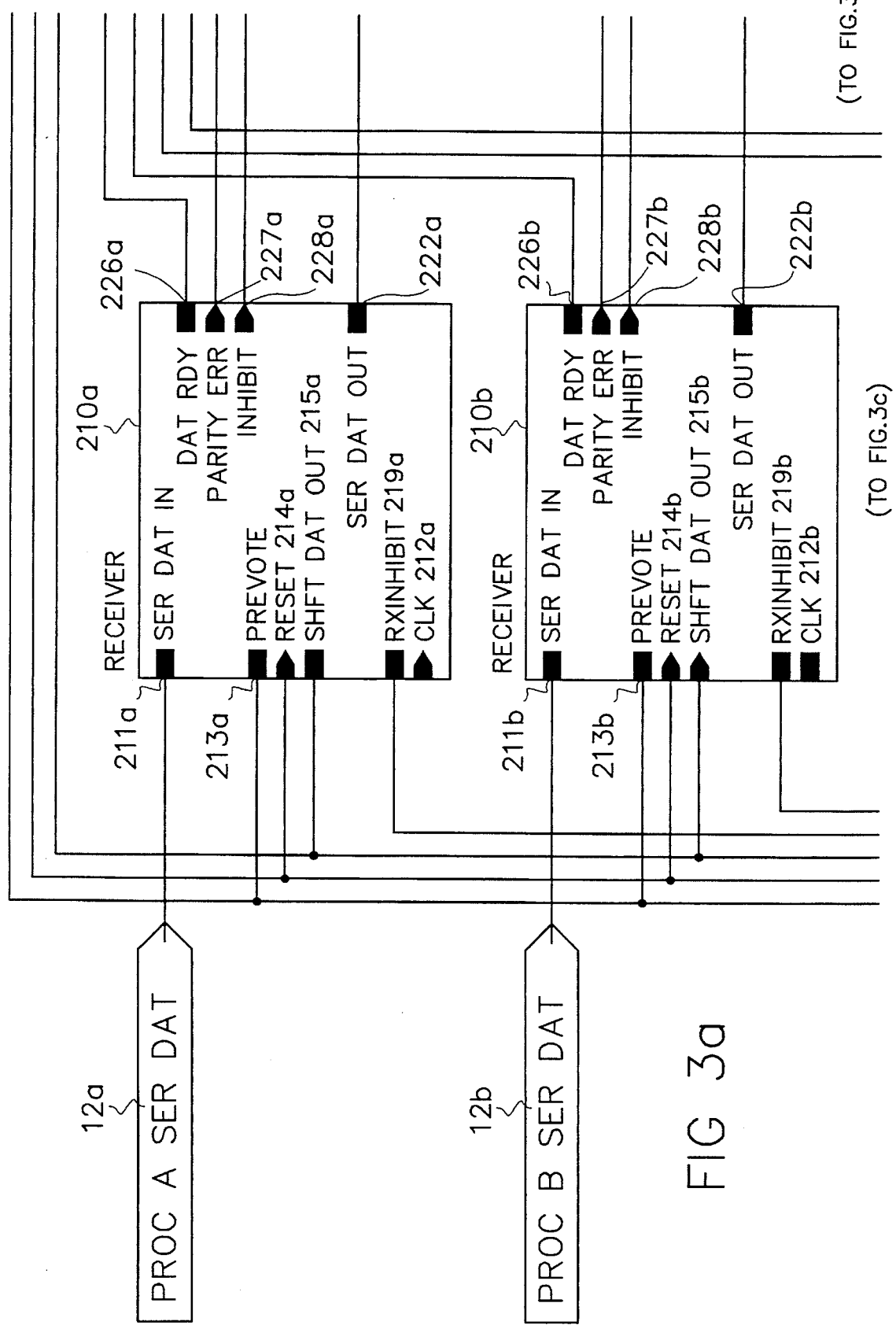
FIG. 3(a–d) is a block diagram of the voting system in accordance with the present invention.
Figure 3C:
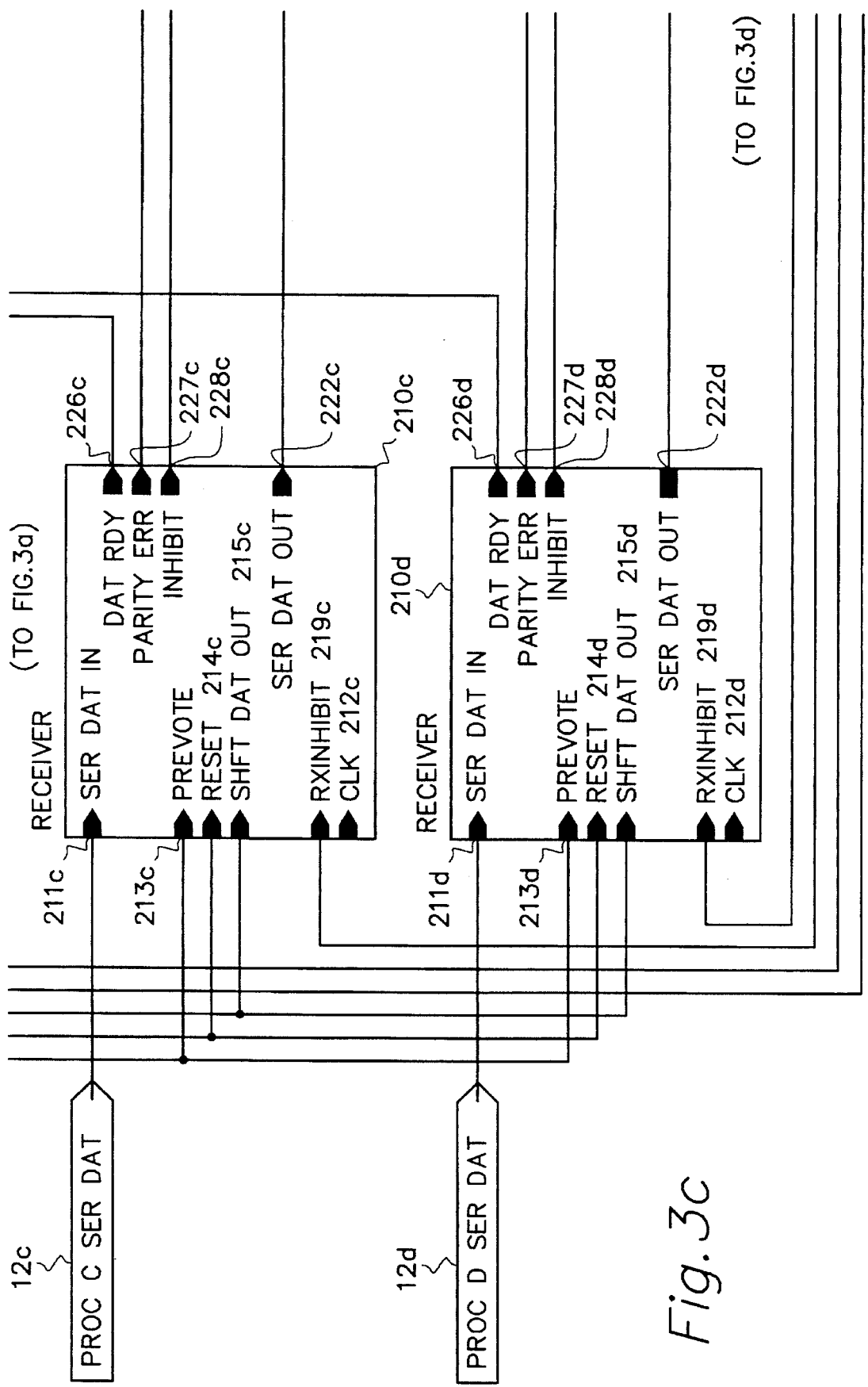
Figure 3D:
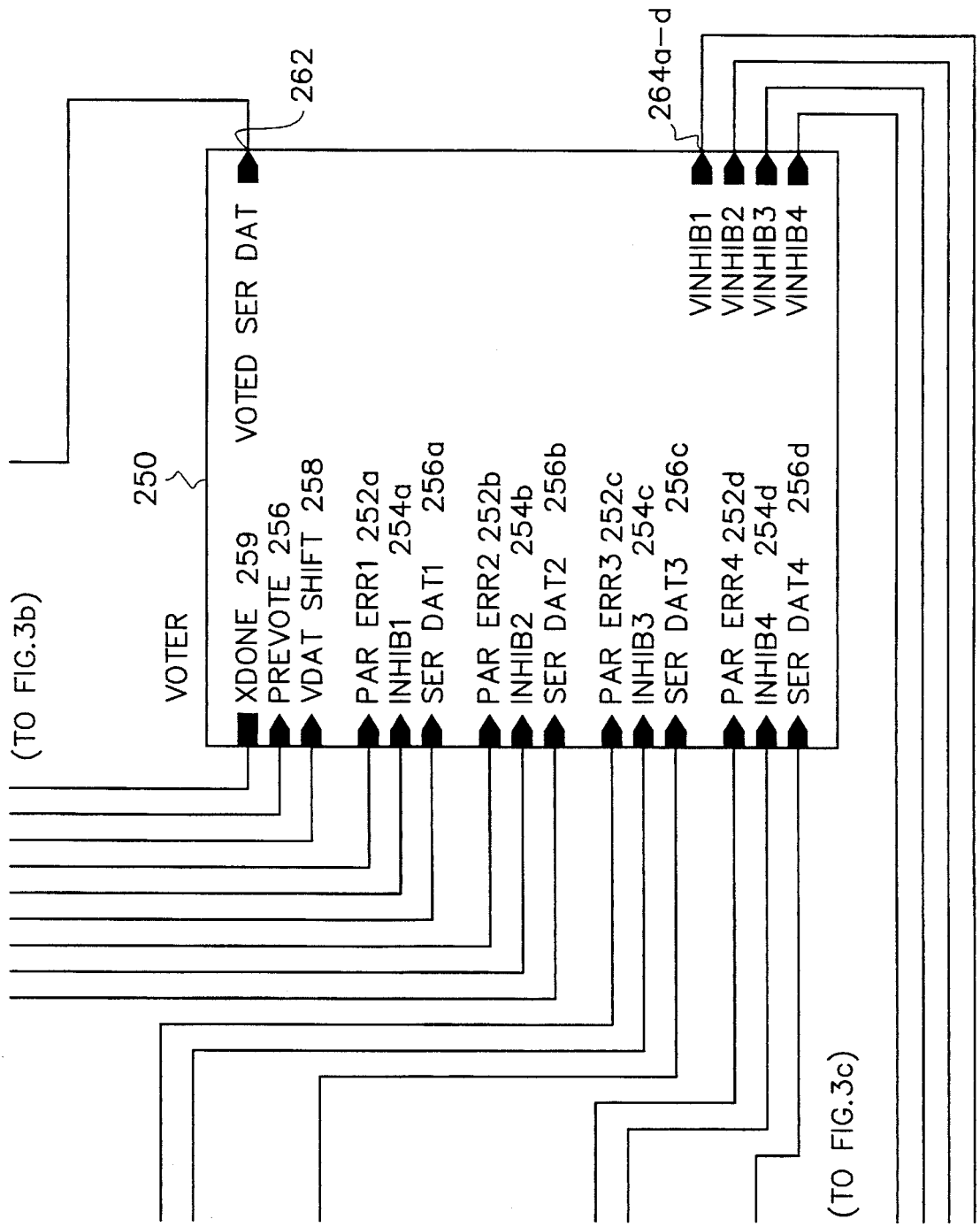

Illustrated in FIG. 3 is a block diagram of the voter system in accordance with the present invention. Thereshown is the serial output means of processors 10a–d having numeral designations 12a–d, like those illustrated in FIG. 1. The voting system in accordance with the present invention includes identical receivers 210a–d, data skew checking means 240, majority voting means 250, and voted output register means 280. Details of receiver means 210a–d are particularly illustrated in FIG. 4 without the "a–d" designations since they are all alike.

The data skew checking means 240 of FIG. 3 includes data ready signal input means 241a–d connected to a corresponding one of data ready output means 226a–d of receivers 210a–d, respectively, for receiving the data ready signals provided by receiver means 210a–d, respectively. Data skew checking means 240 includes PREVOTE COMMAND signal output means 242 and RESET COMMAND signal output means 244 which are connected to PREVOTE COMMAND signal input means 213a–d and RESET COMMAND signal input means 214a–d of receivers 210a–d, respectively, for providing thereto a PREVOTE COMMAND signal and a RESET COMMAND signal, respectively. Data skew checking means 240 also provides a SHIFT COMMAND signal at the SHIFT COMMAND signal output means 246 which is connected to the SHIFT COMMAND signal input means 215a–d of receivers 210a–d, and voted output register means 280.

Figure 4:
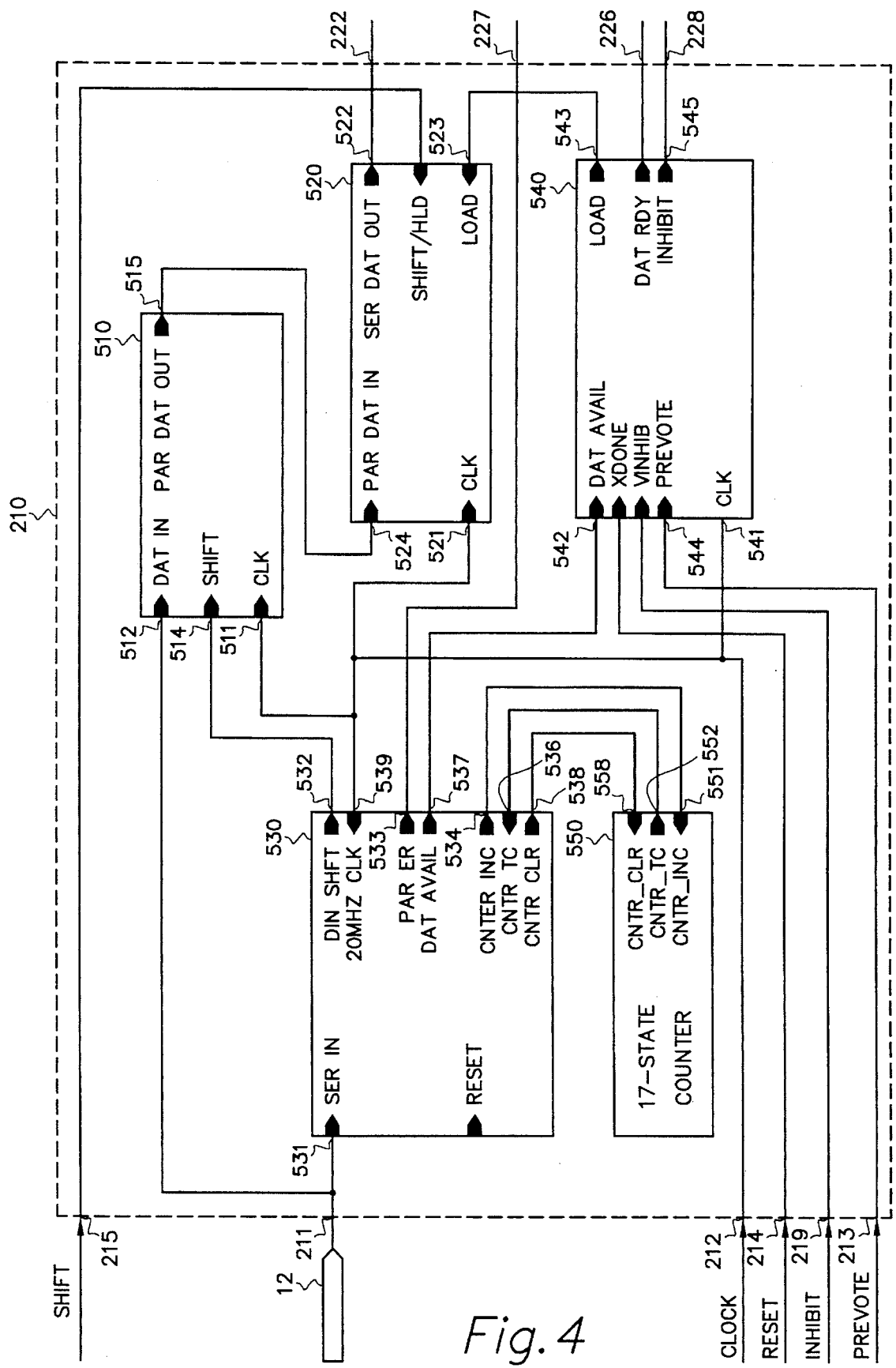
FIG. 4 is a block diagram of a data receiver employed in FIG. 3.

Referring now to FIG. 4, thereshown is an abbreviated block diagram depicting the construction and functions of receiver means 210. Receiver means 210 includes a serial to parallel shift register 510, a parallel to serial shift register 520, a register controller 530, a second register controller 540, and a word bit counter 550. Receiver means 210 includes a serial data input means 211, a clock input means 212, a PREVOTE COMMAND signal input means 213, a RESET COMMAND signal input means 214, a data SHIFT COMMAND signal input means 215, and an inhibit signal input means 219. Receiver means 210 includes serial data output means 222, data ready signal output means 226, parity fail signal output means 227, and voter inhibit signal output means 228.

An exemplary serial output data word provided by processors 10a–d may generally include a start or SYNC bit, a 17 bit data word, and a parity bit as is commonly provided in the art. Receiver means 210 is intended to receive the output serial data word from the processor at input means 211, and provide a delayed serial output data word at output means 222 identical to the received output serial data word from the processor. Further, receiver 210 provides a data ready signal at output means 226 after register 520 has completely received the data word from register 510. Further, receiver means 210 provides a parity fail signal at output means 227, and an inhibit output signal at output means 228 whose functions will be described in further detail below.

Receiver means 210 operates synchronously by a voter system clock signal (clock not shown) provided at the clock input means 212 which is connected to clock input means 511, 521, 539, and 541 of registers 510 and 520, and controllers 530 and 540, respectively.

Controller 530, sometimes referred to as a state machine, controls the reception of the serial data from the corresponding processor, by controlling the sampling and loading of register 510. In the preferred embodiment of the invention, the voter system clock is intended to operate at a rate faster (e.g., four times faster) than the rate of transmitted data from the processor since it is sampling the incoming data to detect the start bit. For example, sampling of the incoming data may occur at the 6the cycle of the voter system clock after the start bit is detected. This permits the incoming data to lag and lead up to 2 voter system clock cycles before data is sampled. Counter 550 in combination with controller 530 counts the incoming data bits so that controller 530 may in turn perform a parity check and issue a data available signal.

As schematically illustrated in FIG. 4, the received data word at input means 211 is provided to the serial data input means 512 of serial to parallel shift register 510 and serial data input means 531 of controller 530. Controller 530 provides a register command signal at output means 532 which is connected to the shift input means 514 of register 510, thereby controlling the sampling of the incoming data.

Figure 5:
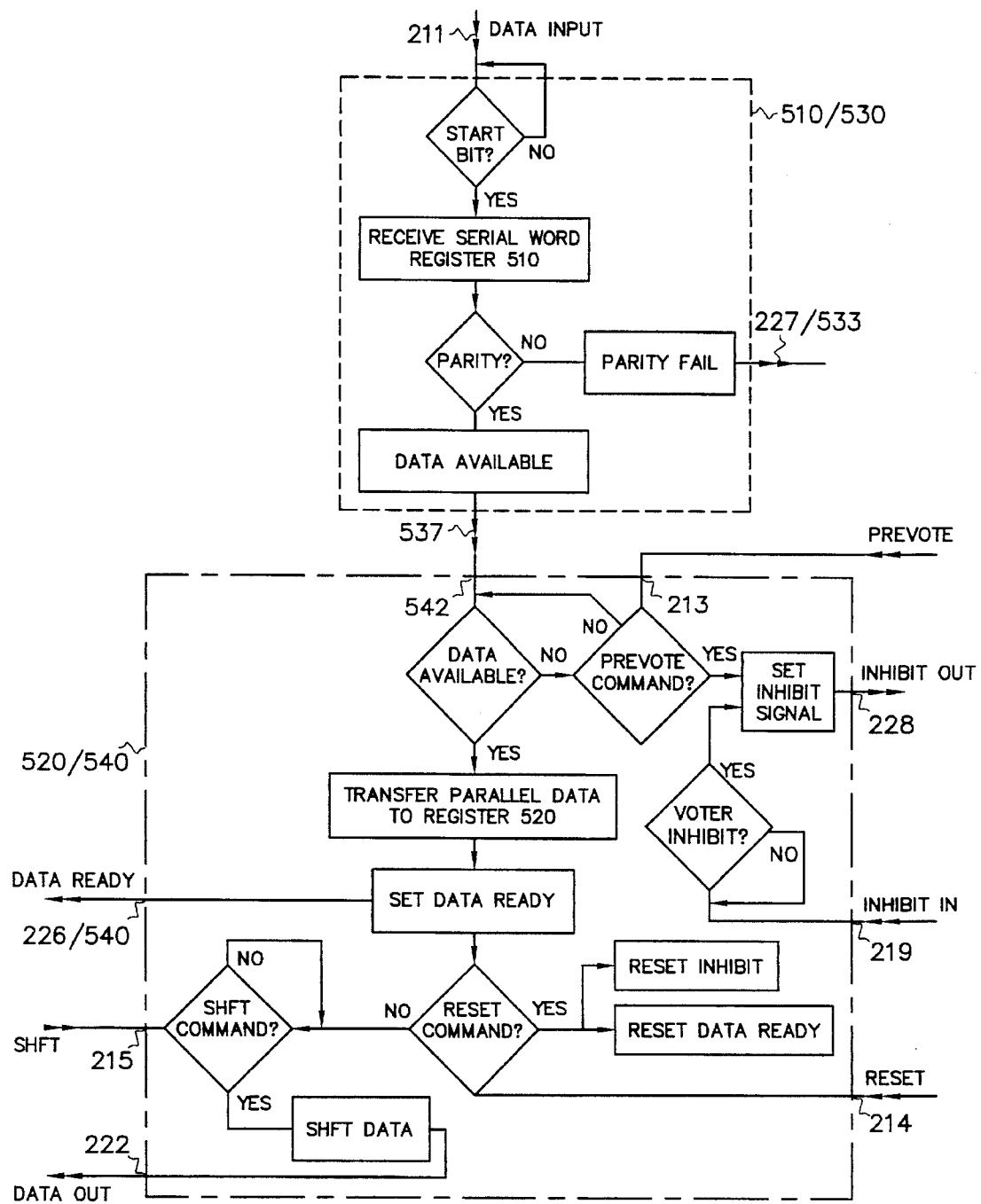
FIG. 5 is a flow diagram which describes the function of the data receiver block of FIG. 4.

The function of controller 530 will now be described with reference to flow diagram illustrated in FIG. 5. Referring now to FIGS. 4 and 5, the numerical designations illustrated in the flow diagram of FIG. 5 are intended to assist the reader to correlate those inputs and outputs indicated on the schematic block diagram of FIG. 4. For example, the parity fail block in the flow diagram of FIG. 5 is illustrated as having output designated "227/533" which corresponds to the numerical output 227 of block 210 which is the same as the numerical parity error output 533 of block 530 illustrated in FIG. 4. The start bit of the received data word is first recognized by controller 530, and provides an output signal at output means 532 which enables shift register 510 to serially receive and move the input data word through register 510. Further, word bit counter 550 receives a count signal at input means 551 from count output means 534 of controller 530. After counter 550 has detected a complete data word of known length (e.g., 19 bits), counter 550 issues a count complete signal at counter 550 output means 552 which is connected to count complete input means 536 of controller 530. In turn, controller 530 issues a data available signal at data available signal output means 537 which in turn is provided as an input to data available signal input means 542 of controller 540. Thereafter, controller 530 issues a clear signal from output means 538 connected to clear input means 558 of counter 550 for resetting the counter 550 and making it ready to count the bits of the next word.

Controller 530 also includes a parity checker which provides an output signal at output means 533 connected to parity output means 227 of receiver mean 210, indicative of a failure of the parity check of the received data word in a well known manner.

Controller 540 serves as a transfer state machine for first conditionally transferring parallel output data from register 510 to register 520, and secondly serially outputting from register 520 the transferred data word at serial data output means 522 of register 520, the same as data output means 222 of receivers 210. Controller 540, subsequent to receiving a data available signal at input means 542 from output means 537 of controller 530, provides a load command output signal at an appropriate cycle count time at output means 543 which is connected to load command signal input means 523 of register 520. Upon receiving the load command signal, register 520 loads the parallel output data at output means 515 of register 510 into register 520 through parallel input means 524.

The transfer of the data, as aforesaid, is dependent upon weather or not a PREVOTE COMMAND signal from data skew checking means 230 was received at input means 213, which is connected to input means 544 of controller 540. If controller 540 receives a data available signal at input means 542 before a PREVOTE COMMAND signal is received at input means 544 from data skew checking means 240, data is transferred from register 510 to register 520; and controller 540 sets or issues a data ready signal at output means 546, the same as output means 228 of receiver 210. However, if a PREVOTE COMMAND signal is issued before the data available signal is detected, controller 530 does not issue a load command signal to register 520, and controller 540 issues an inhibit signal signal from voter inhibit signal output means 228, the same as output means 545 of controller 540.

At the appropriate time subsequent to the issuing of the SHIFT COMMAND signal, data skew checking means 240 issues a RESET COMMAND signal at RESET COMMAND signal output means 244 connected to RESET COMMAND signal input means 214 of receiver 210 which is connected to RESET COMMAND signal input means of controller 540. This signal causes the data ready signal at output means 226 of controller 540 to be reset, thereby placing the receiver 210 in the "wait" condition for the next data word.

The operation of the data skew checking means 240 illustrated in FIG. 4 will now be described with reference to the flow diagram illustrated in FIG. 6 and the block diagram illustrated in FIG. 7. The purpose of the data skew checking means 240 is to respond to the data ready signals at inputs 241a–d thereof provided by receiver means 210a–d for providing a PREVOTE COMMAND signal at a selected time after the second occurrence of two successive data ready signals associated with any two of the receiver means 210, and in which the two successive data ready signals occur within a selected time period relative to each other.

Figure 6:
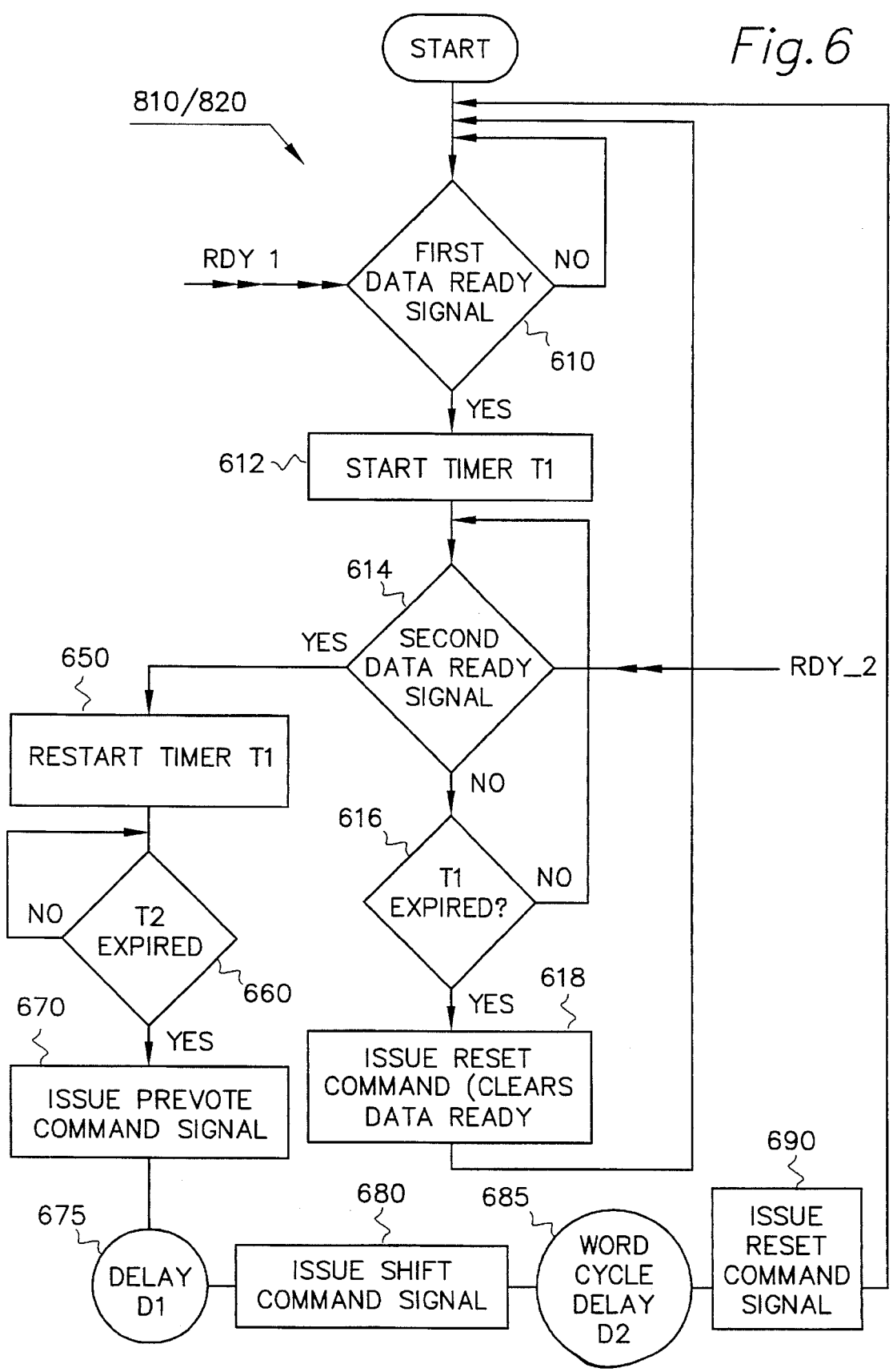
FIG. 6 is a flow diagram which describes the function of the data skew checking block of FIG. 4.
Figure 7:
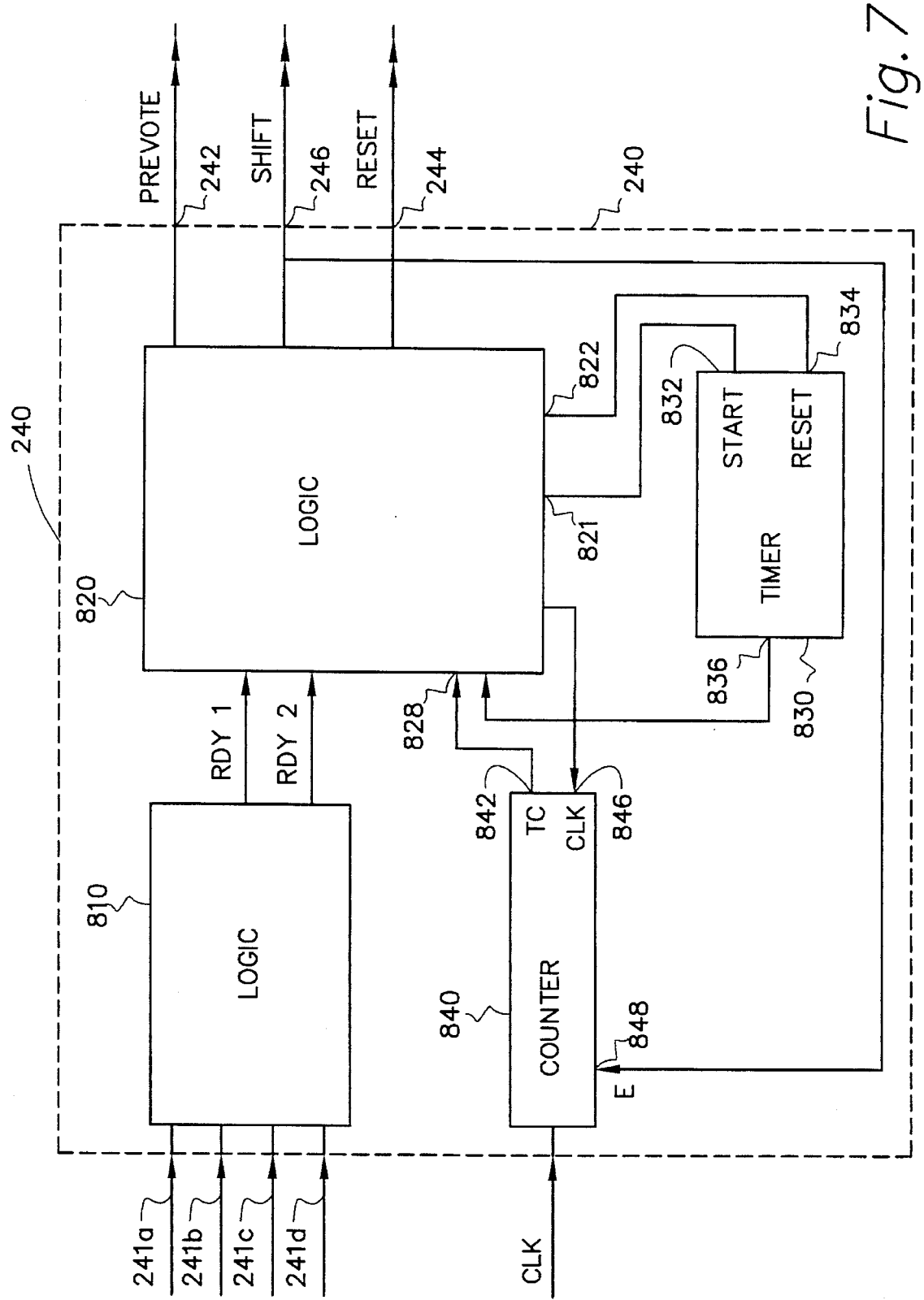
FIG. 7 is a block diagram of the data skew checking block employed in FIG. 3.

An exemplary embodiment for data skew checking means 240 is shown in the abbreviated block diagram illustrated in FIG. 7 which may be embodied by a wide array of circuit elements, logic circuits, programmable logic arrays, microprocessors, software and the like. Data skew checking means 240 comprises digital logic signal processing means illustrated as logic blocks 810 and 820, start/reset timer means 830, and word bit counter 840. Logic block 810 generates logic output signals RDY_1 and RDY_2 presented as inputs to logic block 820. Start/reset timer means 830 includes start and reset signal input means 832 and 834, and elapsed time output signal at output means 836 indicative of the expiration of a selected time T1 after the timer was started. Logic block 820 provides the timer start and reset signals at output means 821 and 822, respectively. Further, logic block 820 provides the aforesaid PREVOTE, SHIFT, and RESET signal as will be particularly described with reference to FIG. 6.

Counter 840 receives as an input 828 the voter system clock signal for counting voter system clock signals. Counter 840 provides a counter output 842 as input to logic block 820 for outputting the PREVOTE, SHIFT, and RESET signals in fixed relation to the voter system clock. Counter 840 also includes a clear input signal means 846 for receiving a clear signal from logic block 820, and a counter enable input 848, for receiving the SHIFT COMMAND signal.

Logic block 810 operates on the data ready signals at input means 241a–d from receivers 210a–d for providing sequential ready check signals $RDY_{-1}$ and RDY_2. RDY_1 is intended to be indicative of the first detected data ready signal from any one of the receivers 210a–d, and RDY_2 is indicative of the occurrence of a successive ready signal from another one of the receivers 210a–d within a prescribed time later as will be more fully described.

Logic block 820 conditionally operates on signals $RDY_{-1}$ and RDY_2 for generating start/reset signals for timer 830. Further, logic block 820 logically operates on ready check signals RDY_1 and RDY_2, the output of timer 830, and the output of counter 840 for selectively generating the PREVOTE, SHIFT, and RESET signals as will be more particularly described with reference to FIG. 6.

The function of data skew checking means 240 may be better understood with reference to the flow diagram illustrated in FIG. 6. Assuming that receivers 210a–d provide a logical signal representative of data "not" being ready, decision box 610 remains in a wait condition until any one of the data ready signals from the output means 214 of receivers 210a–d is detected—indicated by signal RDY_1. Upon a data ready signal detection thereof, i.e., detecting the presence of ready check signal RDY_1, the timing function indicated by action box 612 is initiated, i.e., an elapsed timer illustrated as timing means 830 is started.

Decision box 614 represents the logical operation of detecting ready check signal RDY_2 indicating that a second data ready signal from one of the other receivers 210 has been detected.

Decision box 616 will put out a "yes" flag, upon the condition that ready check signal RDY_2 has not been detected and that the T1 timer 830 has timed out before the occurrence of RDY_2 (output means 836 of timer 830). As a consequence, action box 618 is initiated resulting in data skew checking means 240 issuing a RESET COMMAND signal at output means 244 which causes all of the data ready signals of all receivers to be reset, including the one which initiated the "early" ready check signal RDY_1 thereby resetting the RDY_1 signal which caused the first initiation or start up of the T1 timer, and also resets the timer 830—thereby placing the data skew checking means back into a wait condition at the START of the flow diagram of FIG. 7.

However, if the second ready check signal RDY_2 is received before time T1 has elapsed, decision block 614 puts out a yes flag causing timer T1 to be first reset, and then restarted as indicated by action box 650.

In turn, decision box 660 waits for the expiration of the preselected elapsed time T2, which in the present invention is the same as T1 employing the same timing means 830. After time T2 has elapsed, action box 670 is initiated resulting in data skew checking means 240 issuing the PREVOTE COMMAND signal at output means 242, indicating that the elapsed time checker has been started twice, and that time T2 has elapsed after the second restart of the elapsed timer 830, or more particularly time T2 has elapsed after the second data ready signal as indicated by the ready check signal RDY_2.

Subsequent to the PREVOTE COMMAND signal, for example a delay time D1 of several voter system clock cycles, data skew checking means 240 issues a SHIFT COMMAND signal at output means 246, which in turn causes receiver 210, and more particularly register 520 of each of the receivers, to begin serially shifting the data out of output means 212—this of course is conditionally dependent upon weather or not data was available as depicted in the flow diagram of FIG. 5.

Subsequent to the SHIFT COMMAND signal, counter 840 counts the number of clock cycles required to shift the data word out of register 520 of receiver 210, and perhaps several additional quiet signals. In turn counter 840 provides an output signal 842 to logic block 820 causing data skew checking means 240 to issue a RESET COMMAND signal at output means 244, which in turn resets all of the data ready signals of receivers 210a–d, and the data skew checking means 240 returns to "wait" condition.

Referring again more particularly to FIG. 7, logic means 810 generates the appropriate RDY_1 logic signal upon the first occurrence of a data ready input signal from any one of the processors. In turn, logic block 820 puts out a start signal at output means 821 connected to the start input of timer 830. In turn, if logic means 810 generates the appropriate RDY_2 logic signal upon detecting a second data ready signal at input means 241a–d from any one of the other processors before timer means 830 times out, logic block 820 puts out a reset signal at output means 822, which is connected to the reset input 832 of timing means 830, followed by a start signal at output means 821 for restarting the timer T1 or timing means 830.

Counter 840 provides the function of counting voter system clock cycles after the occurrence of the RDY_2 signal and a PREVOTE COMMAND signal. After several voter system clock cycles, logic means 820 issues a SHIFT COMMAND signal at output means 246; and after a word bit count has been counted, logic means 820 issues a RESET COMMAND signal at output means 244.

In summary, the data skew checking means 240 is responsive to the data ready signals of the receiver means 210 for providing a PREVOTE COMMAND signal (box 670) a selected time after the second occurrence of two successive data ready signals associated with any two of the receiver means 210a–d, in which the two successive data ready signals occur within a selected time period relative to each other. In the preferred embodiment of the invention, both of these selected times are the same, T1 as determined by timer 830.

It should be noted however, that if a data ready signal is much earlier than the remaining data ready signals, the reset signal is presented to input means 214 of each receiver 210a–d causing each control means 540 to reset its data ready signal. Accordingly, decision box 610 may again monitor RDY_1, responsive to all of the data ready signals with knowledge that the one which originally initiated action box 612 has been cleared by the issued RESET COMMAND signal. Therefore, data skew checking means 240 again serves to detect the occurrence of two successive data ready signals which occur within the selected time period, here, T1.

Again referring to FIG. 3, the details of majority voter means 250 will now be described. Majority voter means 250 includes parity error input means 252a–d, inhibit input means 254a–d, serial data input means 256a–d, PREVOTE COMMAND signal input means 256, SHIFT COMMAND input means 258, and reset signal input means 259. Majority voter means 250 further includes voted serial output data means 262 and channel inhibit output means 264a–d.

The connections between the receivers 210 and majority voter means 250 will now be described. As before, the "letter" designations correspond to the corresponding letter designated processors 10a–d and receivers 210a–d. Therefore, only the connections between one of the receivers, for example 210a, will be described. The parity error output means 227a from receiver 210a is connected to the parity input means 252a of voter 250, the inhibit output means 228a from receiver 210a is connected to the inhibit input means 254a of voter 250, and the serial data output means 222a from receiver 210a is connected to the serial input data means 256a of voter 250. Further, the inhibit output means 264a of majority voter means 250 is connected to inhibit input means 219a of receiver 210a.

Voted data register 280 includes SHIFT COMMAND signal input means 282 connected to the SHIFT COMMAND signal output means 246 of data skew checking means 240, serial data input means 284 connected to output means 262 of majority voter means 250, and parallel data output means 288.

The voter system, according to the present invention, and particularly described with reference to FIGS. 4 through 7 will now be described. Each receiver 210 waits for the start bit of the output data word from its corresponding processor. Controller 530 of each of the receivers issues a data available signal at output means 537 upon completion of the data word being transferred into register 510 (FIG. 4). Subsequent to a data available signal, controller 540 causes the transfer of data from register 510 into register 520, and also issues a data ready signal at output means 226, providing that the data was available prior to the issuing of the PREVOTE COMMAND signal by data skew checking means 240. Otherwise, controller 540 issues an inhibit signal at output means 228 which in turn causes the particular processor input channel to majority voter means 280 to be inhibited, that is no longer votes on the inhibited channels data at input means 256.

Data skew checking means 240 monitors the data ready signals from output means 212 of each of the channels. As discussed earlier, data skew checking means 240 provides a PREVOTE COMMAND signal a selected skew time after the second occurrence of two successive data ready signals, associated with any two of the plurality of receivers, and in which these two successive data ready signals occur within a selected delay time, for example, the same as the selected skew time.

Subsequent to the issuing of the PREVOTE COMMAND signal, data skew checking means 240 issues a SHIFT COMMAND signal to both receivers 210, majority voter means 250, and voted data register 280, which initiates the serial transfer of the delayed serial word from register 520 into majority voter means 250 to be voted and shifted into voted output register 280. As this is occurring, majority voter means 250 bit-for-bit votes on those data words at input means 256a–d which have not failed parity or have been inhibited. In turn, voter 250 outputs the "voted" input serial data word into the input means 284 of voted data register 280.

Lastly, at the appropriate time, data skew checking means 240 issues a RESET COMMAND signal for resetting the receivers 210 data ready signals and the voted output data register 280, as well as providing a reset signal for majority voter means 250.

It should be noted that majority voter means 250 further includes error counters for each of the channel inputs. After a selected number of either parity error signals or inhibit signals from a particular channel, majority voter means 280 will issue a channel inhibit signal to controller 540 for causing the inhibit signal output 228 of the particular channel's inhibit signal output means, thereby disallowing majority voter 250 from using the faulty channels data.

It should be recognized by those skilled in the art that circuit construction beyond that which has been disclosed herein is intended to be within the true spirit and scope of the present invention. Although a specific embodiment has been shown for a voter system in accordance with present invention, others are of course possible within the level of skill in the art, and are within the true spirit and scope of the present invention.

More specifically, the foregoing description has been set forth in terms of functional block diagrams including registers, counters, timers, and logic means, and also illustrated in terms of flow diagrams to enhance understanding of the present invention without burdening the reader with detail well known within the level of those skilled in the art. There are, of course, a wide array of implementations for achieving the intended function as depicted in the accompanying claims, all of which are intended to be within the true spirit and scope of the present invention. It should also be noted that although a specific embodiment has been illustrating serial type data word transfers and voting, the invention is also applicable to parallel data word systems.

We claim:

1. A data message voter system for providing a voted output data message resulting from a vote on a processor data output message from each of a plurality of loosely synchronized redundant processors, each having their own processor clock generator, where each of said plurality of loosely synchronized redundant processors operates on common and simultaneously occurring input data messages, performs identical processing steps on said input data messages, and provides said processor data output message at a processor data output means within a fixed skew time relative to each other for a non-faulty redundant processor system, said data message voter system comprising:

a plurality of data receivers, one associated with each of said loosely synchronized redundant processors, where each of said plurality of data receivers is operative for (i) receiving said processor output data message from a corresponding one of said loosely synchronized redundant processors, (ii) generating a data ready signal after said processor data output data message is received, and (iii) providing a receiver data output message, which is identical to said processor output data message, at a corresponding receiver data output means;

data message voting means including means for receiving said receiver data output message from each of said plurality of data receivers and generating voted data output message representative of a bit-for-bit vote of qualified ones of said receiver data output messages are only those of said receiver output data message originating from (i) those of said plurality of data receivers providing a data ready signal occurring no later than a first selected time after a timed occurring one of said data ready signals in which said timed occurring one of said data ready signals occurs no later than a second selected time after an initial one of said data ready signals corresponding to one of said input data messages, (ii) a one of said plurality of data receivers providing said initial one of said data ready signals, and (iii) a one of said plurality of data receivers providing said timed occurring one of said data ready signals; and means independent of processor data output messages synchronizing the plurality of processors periodically at fixed time intervals.

2. A data message voter system for providing a voted output data message resulting from a vote on a processor data output message from each of a plurality of loosely synchronized redundant processors, each having their own processor clock generator, where each of said plurality of loosely synchronized redundant processors operates on common and simultaneously occurring input data messages, performs identical processing steps on said input data messages, and provides said processor data output message at a processor data output means within a fixed skew time relative to each other for a non-faulty redundant processor system, said data message voter system comprising:

a plurality of data receivers, one associated with each of said loosely synchronized redundant processors, where each of said plurality of data receivers includes:

(i) means for receiving said processor output data message from a corresponding one of said loosely synchronized redundant processors, (ii) means for generating a data ready signal after said processor data output data message is received, (iii) means for providing a receiver data output message which is identical to said processor output data message at a corresponding receiver data output means, and (iv) means for receiving a PREVOTE COMMAND signal and VOTE COMMAND signal for causing, in response to said PREVOTE COMMAND signal and said VOTE COMMAND signal, said receiver output data message to be available at said receiver data output means providing that said PREVOTE COMMAND signal was received subsequent to generation of said data ready signal;

a data skew checking means for operating on said data ready signal from each of said plurality of data receivers including:

(i) means for generating a first data ready check signal indicative of the occurrence of the presence of a first occurring one of a first plurality of data ready signals generated by said plurality of data receivers in response to said plurality of loosely synchronized processors receiving an input data message;

(ii) means for generating a second data ready check signal indicative of the occurrence of a second one of said first plurality of data ready signals occurring before a first selected time has elapsed after the occurrence of said first ready check signal;

(iii) means for generating said PREVOTE COMMAND signal a second selected time after the occurrence of said second ready check signal; and (iv) means for generating said VOTE COMMAND signal subsequent to said PREVOTE COMMAND signal;

voting means responsive to said VOTE COMMAND for receiving said receiver data output message and generating a voted data output message representative of a bit-for-bit vote of all of said receiver data output messages corresponding to a common processor input data message; and means independent of processor data output messages periodically synchronizing the plurality of processors each time a predetermined time period has elapsed.

3. The system of claim 2 wherein:

said data skew checking means includes means for providing a RESET COMMAND signal if no other data ready signal occurs before said first selected time has elapsed; and each of said plurality of data receivers includes means responsive to said RESET COMMAND signal for resetting said data ready signal associated therewith.

4. The system of claim 2 wherein said voting means includes means or identifying faulty ones of said plurality of data receivers which generates a corresponding receiver data output message exceeding a selected voted out error rate, and providing a data receiver INHIBIT COMMAND signal to said faulty ones of said plurality of data receivers and each of said plurality of data receivers includes means response to said INHIBIT command signal for inhibiting a data receiver output messages therefrom.

5. A data message voter system for providing a voted output data message resulting from a vote on a processor data output message from each of a plurality of loosely synchronized redundant processors, each having their own processor clock generator, where each of said plurality of loosely synchronized redundant processors operates on common and simultaneously occurring input data messages, performs identical processing steps on said input data messages, and provides said processor data output message at a processor data output means within a fixed skew time relative to each other for a non-faulty redundant processor system, said data message voter system comprising:

a plurality of data receivers, one associated with each of said loosely synchronized redundant processors, where each of said plurality of data receivers includes:
 (i) means for receiving said processor output data message from a corresponding one of said loosely synchronized redundant processors,
 (ii) means for generating a data ready signal after said processor data output data message is received, and
 (iii) means for providing a receiver data output message which is identical to said processor output data message at a corresponding receiver data output means;

data message voting means including means for receiving said receiver data output message from each of said plurality of data receivers and generating a voted data output message representative of a bit-for-bit vote of qualified ones of said receiver data output messages, where said qualified ones of said receiver data output messages are only those of said receiver output data messages originating from (i) those of said plurality of data receivers providing data ready signal occurring no later than a first selected time after a timed occurring one of said data ready signals in which said timed occurring one of said data ready signals occurs no later than a second selected time after an initial one of said data ready signals corresponding to one of said input data messages, (ii) a one of said plurality of data receivers providing said initial one of said data ready signals, and (iii) a one of said plurality of data receivers providing said timed occurring one of said data ready signals; and means independent of processor data output messages synchronizing the plurality of processors only periodically at predetermined fixed time intervals.

6. A voter system for providing a voted output resulting from a vote on a plurality of processor outputs one from each of a plurality of loosely synchronized redundant processors, each processor being programmed to perform identical processing steps on common and substantially simultaneously occurring input data to produce the processor output, said system comprising:

a plurality of data receivers, one associated with each of said processors where each receiver is operative to receive the processor output of its processor and to provide a data ready signal upon receipt thereof, to produce a receiver output which is identical to the processor output and to produce the interrupt signal to its interrupt controller to assure that the output of each processor includes the same number of performed steps;

means connected to said data receivers to start a first timing period upon receipt of the first data ready signal;

means connected to said data receivers to start a second timing period upon receipt of the second data ready signal only if the second data ready signal occurs prior to the end of the first timing period;

voting means including means for receiving the receiver output from each of said plurality of data receivers and generating a voted data output message representative of a bit-for-bit vote of qualified ones of said receiver data output messages, said qualified ones being those which are received from data receivers that produce data ready signals prior to the end of the second timing period; and means independent of processor data output messages periodically restarting the plurality of processors each time a predetermined time period elapses.

\* \* \* \* \*